INVENTOR.
RUSSELL H. MORGAN

BY *Shapiro and Shapiro*

ATTORNEYS

Nov. 22, 1966   R. H. MORGAN   3,287,560
DEVICE FOR MEASURING THE TOTAL RADIATION ENERGY OVER
A WIDE SPECTRUM USING SERIALLY ARRANGED DETECTORS
Filed May 17, 1960   2 Sheets-Sheet 2
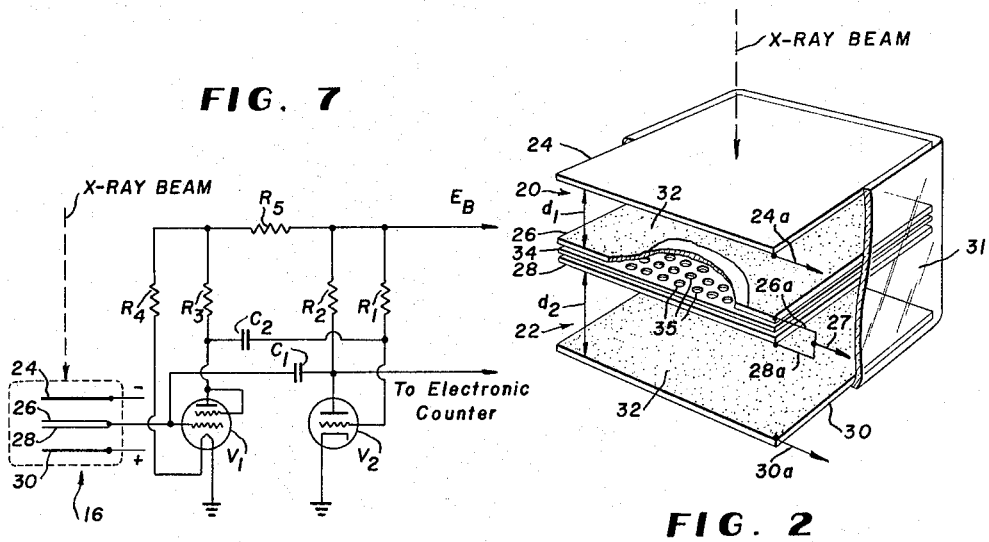
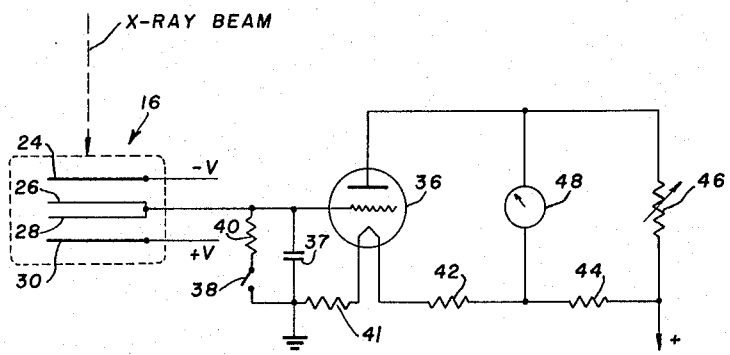
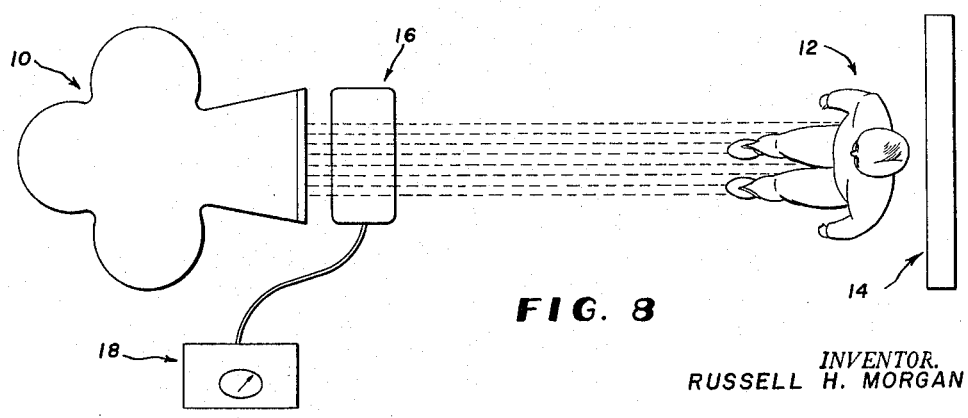
INVENTOR.
RUSSELL H. MORGAN
BY Shapiro and Shapiro
ATTORNEYS United States Patent Office 3,287,560
Patented Nov. 22, 1966

3,287,560
DEVICE FOR MEASURING THE TOTAL RADIATION ENERGY OVER A WIDE SPECTRUM USING SERIALLY ARRANGED DETECTORS
Russell H. Morgan, Baltimore, Md., assignor to Picker X-Ray Corporation, Waite Manufacturing Division, Inc., Cleveland, Ohio, a corporation of Ohio
Filed May 17, 1960, Ser. No. 29,631
19 Claims. (Cl. 250—83.6)

This invention relates to a radiant energy measuring system, and more particularly to the measurement of the radiant energy projected from an X-ray tube during medical radiography and fluoroscopy.

During the past few years, the public has been increasingly concerned regarding the biological effects of ionizing radiation and the hazards of excessive radiation exposure. At the present time, most of the radiation to which the public is exposed is administered during the diagnostic medical procedures of fluoroscopy and radiography. The amount is sufficiently great that many authorities believe that accurate exposure data should be recorded in the files of all hospitals and professional offices with respect to patients who have had diagnostic X-ray procedures performed there. These data, it is felt, would be of considerable value when future examinations are contemplated, in permitting the comparison of medical benefit and radiation risk. The data also would be beneficial in terms of improved estimates of the radiation exposure received by the public and the relation to biological changes.

In general, the biological effects of radiation fall into two groups, (a) genetic and (b) somatic. The genetic effects are produced by irradiation of the gonads. Such exposure causes changes to occur in the germ cells, which lead to anomalies in future generations. This phenomenon, affecting the population well beyond the present, has caused many people to consider genetic effects to be of great significance. As a result, it is now generally recommended that, where X-ray procedures are to be carried out, they be so performed that the gonads are shielded from exposure from the direct X-ray beam. In most cases, as in examinations of the skull, chest, and extremities, this is simply accomplished by collimation of the beam, so that the gonads are not included in the field of exposure. In the case of abdominal studies, lead shields covering the gonads are recommended to prevent the direct beam from passing through them. Even with these measures, however, the gonads receive considerable quantities of radiation scattered from the tissues elsewhere in the body undergoing X-ray study. The amount of the scattered radiation is principally a function of the total quantity of radiant energy projected on the patient (product of energy per unit area by area of field irradiated) and the location of the field (skull, chest, arm, etc.). In the evaluation of radiation risk to the gonads during diagnostic X-ray procedures, therefore, data on the total quantity of radiant energy delivered to individuals undergoing study are of considerable significance.

Measurements of the total radiant energy received by an individual are also valuable where somatic changes are a consideration. The principal somatic changes induced by small doses of radiation are leukemia and perhaps a shortening of life. In both of these cases, the sensitive tissues are so widely distributed throughout the body that measurements of radiation which are a function of energy received per unit area of the irradiated field are of little value in the exaluation of radiation risk. As in the case of genetic changes, total energy values plus a recording of the part examined are the necessary data to be recorded.

Instrumentation widely available today for the measurement of radiation exposure yields data which are a function of the quantity of radiant energy received per unit area of the surface through which the X-ray beam is projected. Hence, if these instruments are employed in monitoring diagnostic X-ray procedures, one must also record the area of the exposed field in order to obtain a measure of the *total quantity of radiant energy projected on a patient*. This need not be difficult in radiography, but it is exeremely so in the case of fluoroscopy, where the physician continually adjusts his field of view through wide limits during the fluoroscopic procedure. Even in radiography, the need to record field size is bothersome, since it makes necessary the recording of an additional number and the manipulation of additional data in the estimation of radiation hazard.

It is thus desirable to provide an instrument which will measure the total radiant energy projected on a patient without requiring the additional measurement of the size of field under examination. Furthermore, the instrument should read directly in units of absolute energy without requiring that the operator measure such secondary parameters as tube-patient distance, X-ray kilovoltage, beam filtration, and exposure time, in order to obtain the needed data. In addition, the placement of the instrument in the X-ray beam should not attenuate the radiation undesirably.

It is accordingly a principal object of the invention to provide an instrument which meets the foregoing criteria.

An ionization chamber placed near the X-ray tube just beyond the tube's filter and collimator and operated as an integrating device might seem ideal as a device for measuring total radiation energy, but conventional chambers have the great shortcoming that their response is not independent of the spectral distribution of the radiant beam. The spectral distribution of the radiant beams employed in diagnostic X-ray practice is very complex, and hence long, tedious, and difficult analysis would be required for the derivation of correction factors to be applied to an ionization chamber's response during a particular procedure in order to obtain the correct energy value.

It is accordingly another principal objective of the invention to provide an instrument for measuring total radiant energy, the response of the instrument being substantially independent of the wavelength of the radiant energy within the spectrum of interest.

It is a general object of the invention to provide unique measuring apparatus and unique circuits.

The foregoing and other objects, advantages, and features of the invention and the manner in which the same are accomplished will become more readily apparent upon consideration of the following detailed description of the invention taken in conjunction with the accompanying drawings, wherein:

FIGURE 2 is a perspective view of a preferred ionization chamber of the invention;

Figure 3:
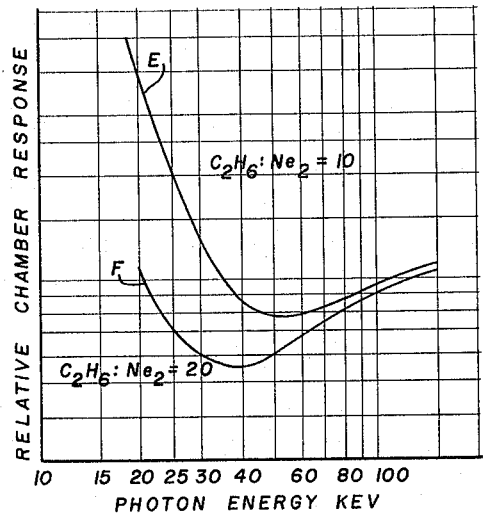
Figure 4:
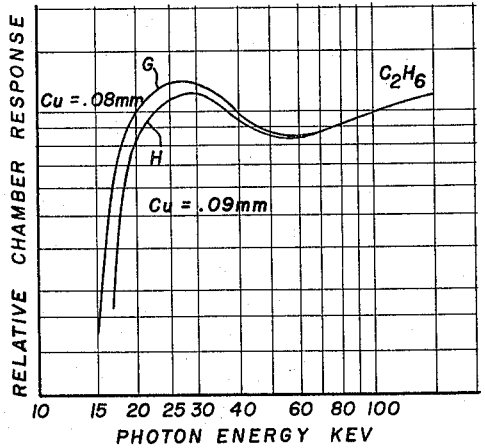
Figure 5:
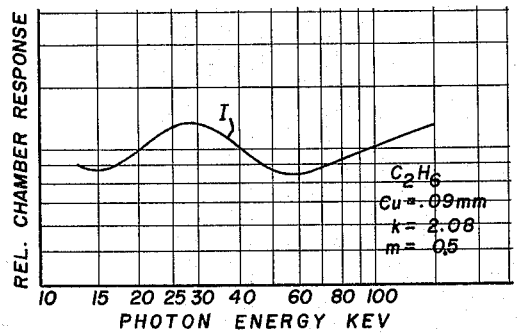

FIGURES 3, 4, and 5 are additional graphs illustrating the spectral response of ionization chambers;

FIGURE 6 is a schematic diagram of a measurement circuit employing an ionization chamber of the invention;

FIGURE 7 is a schematic diagram of an improved circuit in accordance with the invention; and FIGURE 8 is a diagrammatic view illustrating a typical diagnostic radiology installation employing a device for measuring the total radiant energy to which the patient is exposed.

Briefly stated, the invention is concerned with the placement of an ionization chamber near the X-ray tube, just beyond the tube's filter and collimator, and the operation of such a chamber as an integrating device. The construction of the chamber is such that the total radiant energy projected on a patient may be measured without requiring the measurement of secondary parameters and without regard to the wave-length of the radiant energy.

Referring to the drawings, and initially to FIGURE 8 thereof, reference numeral 10 designates a conventional X-ray generator, including the X-ray tube, collimator, filters, power supply, etc. The X-rays are projected onto a patient 12, and an image of the patient's internal organs is produced on a fluorescent screen 14 or X-ray plate. In accordance with the invention, an ionization chamber 16 is placed near the X-ray tube just beyond the tube's filter and collimator, so as to intercept the X-ray beam. The ionization chamber is connected to measurement apparatus 18 having a suitable meter.

Figure 1:
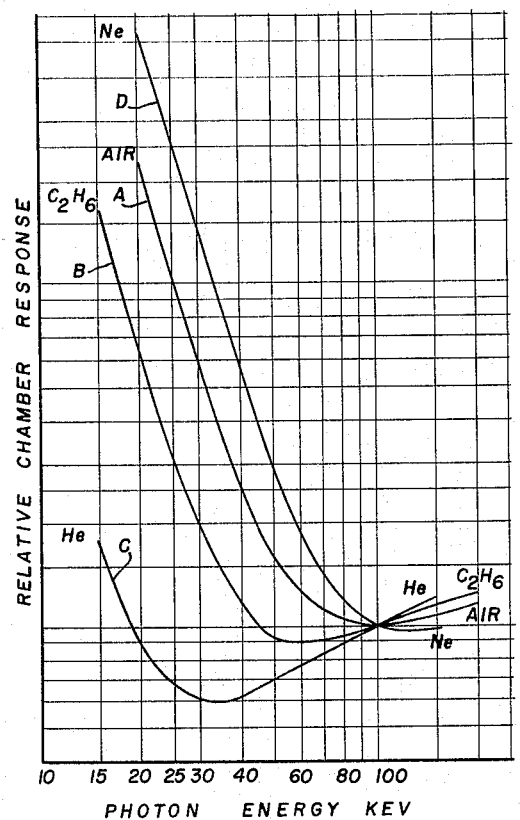
FIGURE 1 is a graph illustrating the spectral response of several ionization chambers.

In diagnostic radiology the portion of the spectrum of interest falls between 15 and 150 kev. FIGURE 1 illustrates the spectral response of several chambers in this photon energy range. In curve A, the response of a chamber containing air and having walls of air-equivalent material is shown. It is evident that in the low energy portion of the spectrum the response is excessively high. The same is also true of an ethane-filled chamber with polyethylene walls (curve B), a helium-filled chamber with lithium walls (curve C), and a neon-filled chamber with neon-equivalent walls (curve D). The excessive response at low photon energies is due to increasing photoelectric absorption by the chamber's gas as photon energy is reduced. The difference between chambers is due to differences in their atomic composition and hence photoelectric absorption.

It is apparent that the foregoing chambers do not have a sufficiently flat response to meet the criteria set forth above of a desirable total radiant energy measuring device. The present invention provides a device which does meet these criteria. As shown in FIGURE 2, the chamber 16 of the invention comprises two gas-filled sections: an upper section or chamber 20 of depth $d_1$ and a lower section or chamber 22 of depth $d_2$. The terms "upper" and "lower" are of course relative, it being assumed for illustration that the X-ray beam is directed downwardly and impinges on the "upper" chamber first and then on the "lower" chamber. The upper chamber is bounded by walls 24 and 26, and the lower chamber by walls 28 and 30, all of which are made as thin as practical to minimize attenuation of the incident radiation. The chambers are enclosed by sidewalls indicated generally at 31 and are sections of a single envelope formed by sidewalls 31, top wall 24, and bottom wall 30. The chamber section walls 24, 26, 28, and 30 are preferably closely similar in atomic composition to the gas enclosed by them, although optimum response may be obtained under some circumstances with other materials. When the enclosed gas is ethane, polystyrene may be employed for walls 24, 26, 28, and 30. Sidewalls 31 may be formed of the same material, or of aluminum or brass, for example. It is preferred that the thickness of walls 24, 26, 28, and 30 not substantially exceed the mean free path of electrons within the wall material in the electron energy range employed. Typically, the wall thickness is of the order of one mm. or so. The undersurfaces of walls 24 and 28 and the upper surface of walls 26 and 30 are coated with a low atomic number conductive material 32, such as aquadag, so as to make these surfaces conductive. The conductive surface of upper wall 24 of the upper section is connected to a source of negative electrical potential by a lead wire 24a, and the conductive surface of the lower wall 30 of the lower section is connected to a source of positive electrical potential by a lead wire 30a. The conductive surfaces of the lower wall 26 of the upper section and the upper wall 28 of the lower section are connected together electrically, as by lead wires 26a and 28a, to form the measuring electrode of the chamber, having a lead wire 27.

In accordance with one form of the invention, an attenuating layer 34 is placed between walls 26 and 28 (which may be formed as a sandwich). In accordance with another form of the invention different gases are included in the two sections of the chamber. Still another form of the invention employs an attenuating layer as well as different gases. The following equations illustrate the theoretical basis for the invention:

The ion current produced in the upper section of the chamber, by radiation of wavelength $\lambda$ is equal to $$i_1 = -E_\lambda g_1 d_1 \qquad (1)$$

where $E_\lambda$ is the energy of the radiant beam of wavelength $\lambda$ incident on the chamber, $g_1$ is a function of the absorptive component of the mass attenuation coefficient of the included gas, and $d_1$ is the thickness or depth of the upper section of the chamber.

The current in the lower section of the chamber is $$i_2 = E_\lambda g_2 d_2 \cdot e^{-u_m \rho x} \qquad (2)$$

where $u_m$ is the mass attenuation coefficient of the attenuating layer 34, $\rho$ is its density, $x$ is its thickness, $g_2$ is a function of the absorptive component of the mass attenuation coefficient of the gas in the lower section, and $d_2$ is the thickness or depth of the lower section of the chamber.

In accordance with a preferred form of the invention, the attenuating layer 34 is perforated, as indicated at 35, so that only a part of the radiation entering the lower section of the chamber is attenuated. If $m$ is the fraction of the attenuating layer's area which is perforated, then Equation 2 becomes $$i_2 = E_\lambda g_2 d_2 m + E_\lambda g_2 d_2 (1-m) e^{-u_m \rho x} \qquad (3)$$

Now if the ratio $d_2/d_1 = k$, then the total current in the chamber from radiation of wavelength $\lambda$ is $$i_T = i_1 + i_2 = d_1 E_\lambda [g_2 k m + g_2 k (1-m) e^{-u_m \rho x} - g_1] \qquad (4)$$

The energy $E$ of wavelength $\lambda$ transmitted by the chamber and incident on the patient is equal to $$E = E_\lambda m + E_\lambda (1-m) e^{-u_m \rho x} \qquad (5)$$

Therefore the response of the chamber relative to the energy incident on the patient is equal to $$i_T/E = \frac{d_1 [g_2 k m + g_2 k (1-m) e^{-u_m \rho x} - g_1]}{m + (1-m) e^{-u_m \rho x}} \qquad (6)$$

The terms in $g$ and $u_m$ in Equation 6 are a function of the photon energy of the beam passing through the chamber. If these parameters can be properly adjusted, the ratio of $i_T/E$ remains relatively constant regardless of wavelength. For example, if $g_1 = g_2$ and $mk = 1$, and if $m$, $k$, $u_m$, $\rho$ and $x$ are chosen so that $$\frac{k(1-m) e^{-u_m \rho x}}{m + (1-m) e^{-u_m \rho x}}$$

is proportional to the reciprocal of $g_2$, the response of the chamber relative to the energy falling on the patient will be constant at all wavelengths. The same situation will prevail if $x$, the thickness of the attenuating layer 34 is zero and if the gases within the chamber are chosen so that $g_1$ is proportional to $kg_2$.

FIGURE 3 shows the relative response of two chambers having the construction of FIGURE 2 employing different gases but without layer 34. Curve E represents a chamber in which $k = 10$ and the gases in the upper and lower chambers are neon and ethane, respectively. With curve F, $k = 20$. By comparison of these curves with the curves for ethane and neon alone, in FIGURE 1, it can be seen that improved response is obtainable with the invention, the examples illustrated being merely representative.

Curves G and H of FIGURE 4 depict the response of chambers like that of FIGURE 2 in which ethane is used as the gas in both sections of the chamber and in which a thin layer 34 of perforated copper is employed. The chamber construction is such that $k=2$ and $m=0.5$. With curve G, $x=0.08$ mm. and with curve H, $x=0.09$ mm. It will be observed that the response is not only significantly improved, but that it has been possible to reverse the direction of the response for low photon energies.

In FIGURE 5, curve I represents the response of a chamber similar to that of curve G, FIGURE 4, but in which $k=2.08$. It is evident that this chamber's response closely meets the requirements of a flat response device. Even flatter response may be obtained by further adjustment of the depth ratio $k$ of the two sections of the chamber, by further adjustment of the perforation fraction $m$ of the attenuating layer 34, and by the use of other gases. The construction just described is easy and economical to manufacture, however, and yields a sufficiently constant response that when the chamber is used with heterogeneous radiation, the precision of the device under almost all circumstances will be within ±5% of the correct energy values.

The operation of a typical device constructed as in FIGURE 2, and in which $k=2$ and $m=0.5$, will now be considered. Since the thickness of walls 24, 26, 28, and 30 is small, their attenuation of the X-ray beam may be neglected. Therefore, when the beam passes through the chamber, the ionization current developed in the section 20 will be equal to the ionization current developed in the section 22 for that part of the beam that passes through the perforations 35 in layer 34. This is so because although the lower chamber has twice the volume of gas of the upper chamber, only one half of the beam passes through the perforations, since perforated and non-perforated areas of layer 34 were made equal. Since these currents are of opposite sign (due to the polarities of the chamber sections), they cancel out, and the only current measured in lead 27 is that due to ionization of the gas in the lower chamber by X-rays passing through the non-perforated areas of layer 24. Since the metal in layer 34 attenuates low-energy photons more than high energy photons, compensation for the high response of gases such as air at low photon energies may be obtained, the desired response being one where ionization current is independent of the photon energy reaching the patient. At the patient the radiant energy is equal to the sum of the energies transmitted by the perforated and non-perforated portions of plate 34. It should be noted that the perforations 35 in layer 34 are made sufficiently small that they cast no shadow on the radiographic film. Also, the perforations permit the passage of the conventional collimator light beam.

Conventionally, ionization chambers, when employed as time-integrating devices, deliver their ionization current to a capacitor which charges continuously during the radiation exposure. The potential developed across the capacitor is then measured with one of a variety of electrometer devices which have a very high leakage resistance and hence do not cause loss of charge during its measurement. One of the most convenient of these devices is the electrometer vacuum tube (e.g., Raytheon No. 5886).

FIGURE 6 illustrates a typical measurement circuit employing an electrometer tube 36. The output electrode 26, 28 of the ionization chamber 16 is connected to the control grid of the tube, and the measurement capacitor 37 is connected from the control grid to the negative side of the power supply (which is grounded in the form of the circuit illustrated). Switch 38 and resistor 40 constitute a discharge path which may be placed across the capacitor 37. One side of the filament of the electrometer tube 36 is connected to the negative side of the power supply through resistor 41. The other side of the filament of the tube 36 is connected through resistors 42 and 44 to the positive side of the power supply, which is connected through an adjustable resistor 46 to the plate of tube 36. A suitable indicator, such as a microammeter 48, is connected from the plate of tube 36 to the junction of resistors 42 and 44. Resistor 46 may be employed to adjust the zero position of the meter 48. The microammeter 48 in the plate circuit of the electrometer tube 36 measures changes in plate current produced by the potentials appearing across the capacitor.

The circuit shown in FIGURE 6 has many shortcomings. In diagnostic radiography and fluoroscopy, the values of radiant energy to be measured range from a few milliwatt-seconds to ten or more watt-seconds—a range of four decades. The circuit will not cover this range unless provision is made to permit the variation of capacitor size through a similar range. This can be done, of course, by suitable switching circuits. However, personnel who use equipment of this kind are usually not well versed in physical mensuration and hence are likely to find the use of such circuits confusing and the cause of interpretative error.

The circuit also requires several other adjustments which are time-consuming and may be the cause of error. For example, before an exposure is made, the ion-current capacitor 37 must be discharged and the microammeter current adjusted to zero. If the operator reverses the sequence of this procedure, serious error will result. What is needed, therefore, is a circuit which requires no adjustment of sensitivity within the range of radiant energies to be encountered, which has automatic discharge of the ion-current capacitor, and which does not require careful zero adjustment of meters or other devices displaying the energy data.

Such a circuit is shown in FIGURE 7. This circuit employs a single capacitor $C_1$ to receive the current from the ionization chamber 16. One end of this capacitor is connected to the output electrode 26, 28 of the ionization chamber and to the control grid of an electrometer tube $V_1$. The other end is connected to the plate of a high-mu triode $V_2$. A second capacitor, $C_2$, is connected between the plate of $V_1$ and the grid of $V_2$. A resistor $R_1$ is connected between the grid of $V_2$ and the positive plate supply voltage $E_B$. A second resistor, $R_2$, is connected from this supply voltage to the plate of $V_2$, and a third resistor, $R_3$, is connected from the plate of $V_1$ to the junction point of resistors $R_4$ and $R_5$. The other end of $R_4$ is connected in series with the filament of $V_1$ to ground (the negative supply voltage), and the other end of $R_5$ is connected to $E_B$. The electrodes 24 and 30 of the ionization chamber 16 are connected to negative and positive potentials, respectively.

The circuit operates in the manner of a triggered multivibrator as follows: The arrangement of the circuit is such that $V_1$ is normally non-conducting and $V_2$ is conducting. Under these conditions, the plate and grid potentials of $V_2$ are near ground and the potential across $C_1$ is such that the grid of $V_1$ is biased far negatively. When radiation falls on the ionization chamber, the potential of the capacitor at the grid of $V_1$ rises. Ultimately, as the exposure continues, the potential on the grid of $V_1$ rises to the point that current flows in the tube's plate circuit. Thereupon the plate voltage of $V_1$ drops because of the potential developed across $R_3$; the grid potential of $V_2$ also drops because of its connection to $V_1$'s plate through capacitor $C_2$. This causes a reduction of the plate current in $V_2$ and hence a rise in $V_2$'s plate potential. Since the grid of $V_1$ is connected to the plate of $V_2$ through $C_1$, this causes a further rise in the grid potential of $V_1$. This action of positive or regenerative feedback causes the grid potential of $V_1$ to rise very rapidly until this grid reaches ground potential. Simultaneously the plate of $V_1$ draws sufficient current that it approaches ground potential. This causes the grid of $V_2$ to be driven far negatively (approximately equal to the level of $V_1$'s plate supply) and causes $V_2$'s plate current to be cut off. As a result $V_2$'s plate potential rises to the supply voltage $E_B$, and $C_1$ becomes charged to a potential equal to $E_B$. $V_1$ remains conducting only briefly, however, because $C_2$ rapidly charges positively through $R_1$, and in a few microseconds the grid potential of $V_2$ rises until plate current flows in $V_2$. Thereupon, the plate potential of $V_2$ falls to ground level, and the grid potential of $V_1$ is driven far negatively by the potential on $C_1$. The plate current through $V_1$ is therefore cut off and remains so until enough current flows from the ionization chamber into $C_1$ to trigger the cycle again. Each time that the circuit goes through its cycle, a pulse is generated across $R_2$. This pulse may be used to drive a conventional electronic counting device. Such instruments are widely known to the art and hence require no further elaboration here.

The charge delivered to the capacitor $C_1$ by the ionization chamber during one cycle is proportional to the radiant energy received by the chamber in this interval. The circuit parameters are chosen so that the total number of counts made during an X-ray exposure is proportional to the total radiant energy received by the chamber. By suitable calibration of the counter, therefore, the operator may read values of total energy transmitted by the chamber under a wide range of conditions in radiography and fluoroscopy. Counters having a range of 4 or more decades are readily available. They are easily read with a minimum of interpretative error, and they may be easily reset at the end of an exposure simply by pushing a single switch.

The circuit, shown in FIGURE 7, it will be noted, requires no charging or discharging of capacitors by the operator. Its combination with an electronic counter therefore provides an extremely reliable device having a wide operating range. When used with the difference chamber of the type illustrated in FIGURE 2, it provides an instrument which measures radiant energies without requiring the operator to be concerned with the instrument's spectral sensitivity, the area of the exposed field, the exposure time, the X-ray beam's filter, or the kilovoltage applied to the X-ray tube. Readings are made directly in absolute energy units with an absolute minimum of instrumentation adjustment.

While a preferred embodiment of the invention has been shown and described, it will be apparent to those skilled in the art that changes can be made in this embodiment without departing from the principles and spirit of the invention, the scope of which is defined in the appended claims. Accordingly, the foregoing embodiment is to be considered illustrative, rather than restrictive of the invention, and those modifications which come within the meaning and range of equivalency of the claims are to be included therein.

The invention claimed is:

1. A device for measuring the energy of radiation of substantial spectrum regardless of the wave length distribution within said spectrum, comprising a pair of serially arranged ionization chambers, each containing a gas which forms ions under the influence of incident radiation, said chambers having electrode means for producing a differential electrical output therefrom in response to the ionization of the gas of said chambers, said chambers being separated by a layer of material which attenuates the incident radiation, said layer having an attenuation characteristic for photon energy within said spectrum which complements the response characteristics of said chambers for such energy to cause said output to vary as a function of the energy of the incident radiation regardless of the wave length distribution within said spectrum, the ratio of said output to the energy of the radiation through said chambers being substantially constant over said spectrum.

2. The device of claim 1, the outer walls of the chambers through which radiation passes being formed of material having an atomic composition equivalent to the atomic composition of the gas within the respective chambers.

3. The device of claim 2, said layer of material having substantially greater attenuation for the incident radiation than said outer chamber walls.

4. The device of claim 3, said outer chamber walls having a thickness less than the mean free path of electrons within the wall material in the electron energy range of the incident radiation.

5. The device of claim 1, said attenuating layer being perforated so as to pass a portion of the incident radiation substantially unattenuated.

6. The device of claim 5, the ratio of the depths of the chambers in the direction of the incident radiation having a predetermined correlation with the proportion of said layer which is perforated.

7. The device of claim 5, the second chamber upon which the radiant energy impinges having substantially twice the depth of the first chamber, and the perforations in the attenuating layer occupying substantially 50 percent of the layer.

8. The device of claim 7, said gas being ethane, and said attenuating layer being formed of copper.

9. A circuit of the type described, comprising an electrometer tube, and another discharge device having an output electrode and a control electrode, a condenser connecting the output electrode of said other discharge device to the control electrode of said electrometer tube, another condenser connecting the output electrode of said electrometer tube to the control electrode of said other discharge device, means including a resistor network for coupling said electrometer tube, said other discharge device, and said condensers to a power supply, and means for applying electric energy to be measured to the control electrode of said electrometer tube.

10. The circuit of claim 9, said resistor network including first resistor connecting the control electrode of said other discharge device to one side of said power supply, a second resistor connecting the output electrode of said other discharge device to said side of the power supply, a third resistor connected to the output electrode of said electrometer tube, a fourth resistor connected to one side of the filament of said electrometer tube, and a fifth resistor connecting said third and fourth resistors to said one side of said power supply, the other side of the filament of said electrometer tube being connected to the other side of said power supply, and said other discharge device having a connection to said other side of said power supply to complete its energization circuit.

11. The circuit of claim 10, said other discharge device being a high-mu triode.

12. A device for measuring the energy of radiation of substantial spectrum regardless of the wavelength distribution within said spectrum, comprising a pair of serially arranged ionization chambers containing different gases which form ions under the influence of incident radiation, said chambers having electrode means for producing a differential electrical output therefrom in response to the ionization of said gases, the outer walls of said chambers through which the radiation passes being formed of a material having an atomic composition equivalent to the atomic composition of the gases within the respective chambers, the absorptive components of the mass attenuation coefficients of the gases in said chambers being correlated to cause the ratio of the differential output of said device with respect to the energy of the radiation through said chambers to be substantially more constant over said spectrum than the ratio of the individual output of either of said chambers with respect to that energy.

13. Apparatus for measuring the total energy of ionizing radiation of substantial spectrum projected from a radiation generator onto a subject, comprising an ionization chamber adjacent said generator in the path of substantially all of said radiation incident upon said subject, and means for causing said chamber to produce an electrical output proportional to the energy of said radiation regardless of the wavelength distribution of said radiation within said spectrum, the output of said chamber being connected to a measuring circuit comprising a multi-vibrator having a pair of discharge devices connected regeneratively by means including a measurement capacitor, one of said discharge devices being an electrometer tube, said circuit being connected to be triggered when the output of said chamber amounts to a predetermined quantity of radiation energy, whereby a pulse representative of such energy is produced.

14. The apparatus of claim 13, said measuring circuit having an output connected to a pulse counter.

15. A system for measuring the total energy of radiation over a period of time, comprising radiation detector means for producing a continuous electrical output proportional to the energy of the radiation incident thereon, pulser means having a storage device for storing said detector output until a predetermined quantity of energy has been stored and then for discharging said energy and producing a pulse, and means for counting the total number of such pulses during said period.

16. A system for measuring total electric energy over a period of time, comprising means for producing a continuous electrical output proportional to said energy, normally quiescent multivibrator means having a coupling capacitor for storing said output until a predetermined quantity of energy has been stored and then for discharging said energy and producing a pulse, and means for counting the total number of such pulses during said period.

17. Apparatus for measuring the intensity of a beam of X-radiation, comprising a pair of serially-arranged ionization chambers arranged to be traversed in succession by the whole X-radiation beam, each of said chambers containing a gas which forms ions under the influence of incident radiation, said chambers having electrode means for producing a differential electrical output therefrom in response to the ionization of the gas of said chambers, said chambers being separated by a layer of material which attenuates the incident radiation, said attenuating layer and said chambers being constructed so that the differential electrical outputs in response to at least two different wavelengths of the incident radiation beam are proportional to the intensities of the X-rays at said two wavelengths.

18. Apparatus for measuring the total energy of ionizing radiation of substantial spectrum projected from a radiation generator onto a subject, comprising a pair of ionization chambers adjacent to said generator serially arranged in the path of substantially all of said radiation projected upon said subject, each chamber containing a gas which forms ions under the influence of incident radiation, said chambers having means for producing a differential electrical output therefrom in response to the ionization of the gas of said chambers, said chambers being separated by a layer of material which attenuates the incident radiation, said layer having an attenuation characteristic for photon energy within said spectrum which complements the response characteristics of said chambers for such energy to cause said output to vary as a function of the energy of the incident radiation regardless of the wavelength distribution within said spectrum, the ratio of said output to the energy of the radiation through said chambers being substantially constant over said spectrum, and means for totalizing said output over a period of time.

19. Apparatus for measuring the total energy of ionizing radiation of substantial spectrum projected from a radiation generator onto a subject, comprising a pair of ionization chambers adjacent to said generator serially arranged in the path of substantially all of said radiation projected upon said subject, said chambers containing different gases which form ions under the influence of incident radiation, said chambers having means for producing a differential electrical output therefrom in response to the ionization of said gases, the outer walls of said chambers through which the radiation passes being formed of a material having an atomic composition equivalent to the atomic composition of the gases within the respective chambers, the absorptive components of the mass attenuation coefficient of the gasses in said chambers being correlated to cause the ratio of the differential output of said device with respect to the energy of the radiation through said chambers to be substantially more constant over said spectrum than the ratio of the individual output of either of said chambers with respect to that energy, and means for totalizing said differential output over a period of time.

References Cited by the Examiner

UNITED STATES PATENTS

| | | | |
|---|---|---|---|
| 2,487,216 | 11/1949 | Blau et al. | 250—83.6 |
| 2,531,804 | 11/1950 | Carlin et al. | 250—83.6 |
| 2,638,560 | 5/1953 | Borkowski | 313—93 |
| 2,643,343 | 6/1953 | Rainwater | 313—93 X |
| 2,752,508 | 6/1956 | Zito | 250—83.6 |
| 2,756,347 | 7/1956 | White | 250—83.6 |
| 2,761,071 | 8/1956 | Hurst | 250—83.1 |
| 2,825,816 | 3/1958 | Rogers | 250—95 |
| 2,883,551 | 4/1959 | Zito | 250—83.6 |
| 2,883,554 | 4/1959 | Reed et al. | 250—95 |
| 2,917,648 | 12/1959 | Davidon | 313—93 |
| 2,948,812 | 8/1960 | Quinn | 250—83.6 |
| 2,968,726 | 1/1961 | Bersin et al. | 250—83.6 |
| 2,974,231 | 5/1961 | Greenblatt et al. | 250—83.3 |
| 2,986,636 | 5/1961 | Carlson et al. | 250—83.6 |
| 3,022,424 | 2/1962 | Anton | 250—83.6 |

RALPH G. NILSON, *Primary Examiner.*

ARTHUR GAUSS, *Examiner.*

A. R. BORCHELT, E. STRICKLAND, W. F. LINDQUIST, *Assistant Examiners.*